United States Patent
Yu et al.

(10) Patent No.: US 11,681,008 B2
(45) Date of Patent: Jun. 20, 2023

(54) SYSTEM AND METHOD FOR MODIFYING SIGNALS TO DETERMINE AN INCIDENCE ANGLE OF AN ACOUSTIC WAVE

(71) Applicant: Toyota Motor Engineering & Manufacturing North America, Inc., Plano, TX (US)

(72) Inventors: Ziqi Yu, Ann Arbor, MI (US); Xiaopeng Li, Ann Arbor, MI (US); Taehwa Lee, Ann Arbor, MI (US)

(73) Assignee: Toyota Motor Engineering & Manufacturing North America, Inc., Piano, TX (US)

( * ) Notice: Subject to any disclaimer, the term of this patent is extended or adjusted under 35 U.S.C. 154(b) by 183 days.

(21) Appl. No.: 17/379,482

(22) Filed: Jul. 19, 2021

(65) Prior Publication Data
US 2023/0015976 A1     Jan. 19, 2023

(51) Int. Cl.
*G01S 3/808* (2006.01)
*H04R 1/40* (2006.01)
*H04R 3/00* (2006.01)

(52) U.S. Cl.
CPC ............ *G01S 3/8083* (2013.01); *H04R 1/406* (2013.01); *H04R 3/005* (2013.01)

(58) Field of Classification Search
CPC ....... G01S 3/8083; H04R 1/406; H04R 3/005; H04R 2430/21
See application file for complete search history.

(56) References Cited

U.S. PATENT DOCUMENTS

| | | | |
|---|---|---|---|
| 5,778,082 A | 7/1998 | Chu et al. | |
| 8,126,183 B2 | 2/2012 | Enstad et al. | |
| 10,823,814 B2 | 11/2020 | Kang et al. | |
| 11,153,681 B2* | 10/2021 | Lee | H04R 1/406 |
| 2019/0174244 A1 | 6/2019 | Kim et al. | |

(Continued)

FOREIGN PATENT DOCUMENTS

KR     20090098426 A     9/2009

OTHER PUBLICATIONS

Ruffier et al., "A tiny directional sound sensor inspired by crickets designed for Micro-Air Vehicles," Sensors, 2011 IEEE (pp. 970-973). IEEE.

*Primary Examiner* — Daniel Pihulic
(74) *Attorney, Agent, or Firm* — Christopher G. Darrow; Darrow Mustafa PC (57) ABSTRACT

Systems and methods for virtually coupled resonators to determine an incidence angle of an acoustic wave are described herein. In one example, a system includes a processor and first and second transducers in communication with the processor. The first transducer produces a first signal in response to detecting an acoustic wave, while the second transducer produces a second signal in response to detecting the acoustic wave. The system may also include a memory in communication with the processor and having machine-readable instructions that cause the processor to modify the first signal and the second signal using a virtual resonator mapping function to generate a modified first signal and a modified second signal. The virtual resonator mapping function changes the first signal and the second signal to be representative of signals produced by transducers located within a hypothetical chamber of a hypothetical resonator.

20 Claims, 6 Drawing Sheets

(56) References Cited

U.S. PATENT DOCUMENTS

2021/0127201 A1\* 4/2021 Lee .................. H04R 1/406
2023/0015976 A1\* 1/2023 Yu ................... H04R 1/406
2023/0032254 A1\* 2/2023 Li ................... G10K 11/16
2023/0042380 A1\* 2/2023 Li ................... F16F 15/02

\* cited by examiner

SYSTEM AND METHOD FOR MODIFYING SIGNALS TO DETERMINE AN INCIDENCE ANGLE OF AN ACOUSTIC WAVE

TECHNICAL FIELD

The subject matter described herein relates, in general, to systems and methods for virtually coupled resonators to determine an incidence angle of an acoustic wave.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Sensing the incident angle of acoustic waves is required for many applications, such as applications involving the localization of a sound source. Systems for sensing acoustic incident angle usually measure the difference in acoustic wave arrival time, or phase difference, at two or more spaced-apart microphones. A significant disadvantage of this approach is that it generally requires a substantial distance between the multiple microphones, making it very difficult to use a compact design. Thus, such phase-difference acoustic direction sensing systems are very difficult to adapt to applications requiring, or benefiting from, a small size.

SUMMARY

This section generally summarizes the disclosure and does not comprehensively explain its full scope or all its features.

In one example, a system includes a processor and first and second transducers in communication with the processor. The first transducer is configured to produce a first signal in response to detecting an acoustic wave, while the second transducer is configured to produce a second signal in response to detecting the acoustic wave.

The system may also include a memory in communication with the processor and having machine-readable instructions. When executed by the processor, the machine-readable instructions cause the processor to modify the first signal and the second signal using a virtual resonator mapping function to generate a modified first signal and a modified second signal. The virtual resonator mapping function changes the first signal and the second signal to be representative of signals produced by transducers located within a hypothetical chamber of a hypothetical resonator. The machine-readable instructions may further cause the processor to determine an incidence angle of the acoustic wave based on a ratio of the modified first signal and the modified second signal.

In another example, a method may include the steps of obtaining a first signal produced by a first transducer in response to detecting an acoustic wave and obtaining a second signal produced by a second transducer in response to detecting an acoustic wave. The method may also include modifying the first signal and the second signal using a virtual resonator mapping function to generate a modified first signal and a modified second signal. Like before, the virtual resonator mapping function changes the first signal and the second signal to be representative of signals produced by transducers located within a hypothetical chamber of a hypothetical resonator. The method may further include determining an incidence angle of the acoustic wave based on a ratio of the modified first signal and the modified second signal.

In yet another example, a non-transitory computer-readable medium may have instructions that cause the processor to obtain a first signal produced by a first transducer in response to detecting an acoustic wave and obtain a second signal produced by a second transducer in response to detecting an acoustic wave. The instructions may further cause the processor to modify the first signal and the second signal using a virtual resonator mapping function to generate a modified first signal and a modified second signal. The virtual resonator mapping function changes the first signal and the second signal to be representative of signals produced by transducers located within a hypothetical chamber of a hypothetical resonator. The instructions may further cause the processor to determine an incidence angle of the acoustic wave based on a ratio of the modified first signal and the modified second signal.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for modifying signals produced by transducers in response to an incoming acoustic wave. Moreover, the system includes two transducers that produce signals in response to an incoming acoustic wave. The system modifies the signals produced by the two transducers using a virtual mapping function, which essentially modifies the signals to represent signals that would normally be produced if the transducers were located within a chamber of a resonator, such as shown and described in U.S. Pat. App. Pub. No. 2021/0127201A1, which is herein incorporated by reference in its entirety.

The use of a resonator described in U.S. Pat. App. Pub. No. 2021/0127201A1 provides enhanced amplitude sensitivity with more compact design potential. However, strong resonance may inversely disturb the sound to be sensed. To mitigate this negative impact, the system and method described herein provide for virtually coupled resonators that can be implemented instead of physical resonators.

Figure 1:
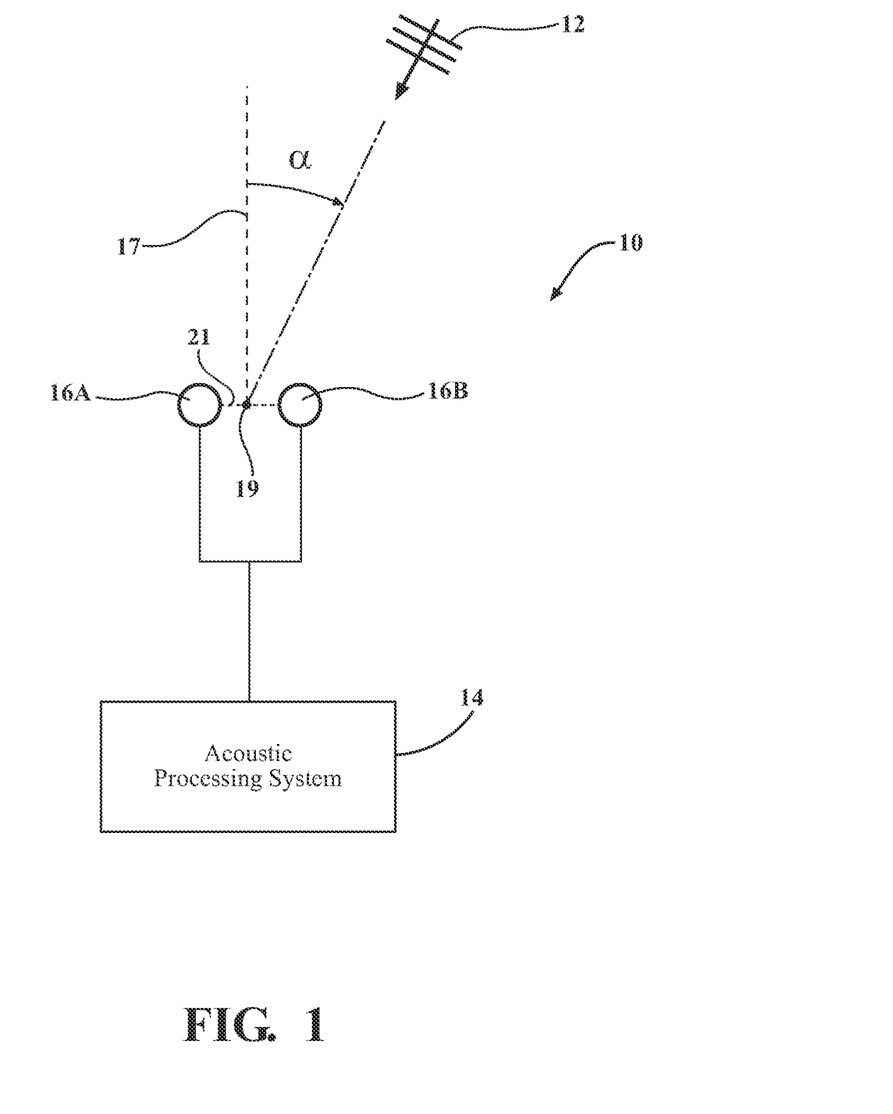
FIG. 1 illustrates an example of a system for modifying signals to determine an incidence angle of an incoming acoustic wave.

FIG. 1 illustrates one example of a system 10 for modifying signals that may be utilized to determine the incidence angle of an incoming sound. Here, the system 10 includes an acoustic processing system 14. The acoustic processing system 14 may be operably connected to transducers 16A and 16B. The transducers 16A and/or 16B may be microphones and, more specifically, may be condenser microphones. However, it should be understood that the transducers 16A and/or 16B can take any one of a number of different forms but should produce a signal in response to detecting acoustic waves. Broadly, the transducers 16A and 16B produce electrical signals in response to an acoustic wave, such as the incoming acoustic wave 12. The acoustic processing system 14 receives the signals produced by the transducers 16A and 16B and modifies the signals using a virtual mapping function.

As will be explained in greater detail later, the virtual mapping function essentially modifies the signals produced by the transducers 16A and 16B so that they are representative of signals produced if the transducers 16A and 16B were located in separate chambers of a resonator. As explained previously, placing the transducers 16A and 16B with a chamber of a resonator may enhance amplitude sensitivity but may cause strong resonance that may disturb the sound to be sensed. The acoustic processing system 14, upon modifying the signals produced by the transducers 16A and 16B, may determine the incidence angle α of the incoming acoustic wave 12 based on a power ratio of the modified signals.

Figure 2:
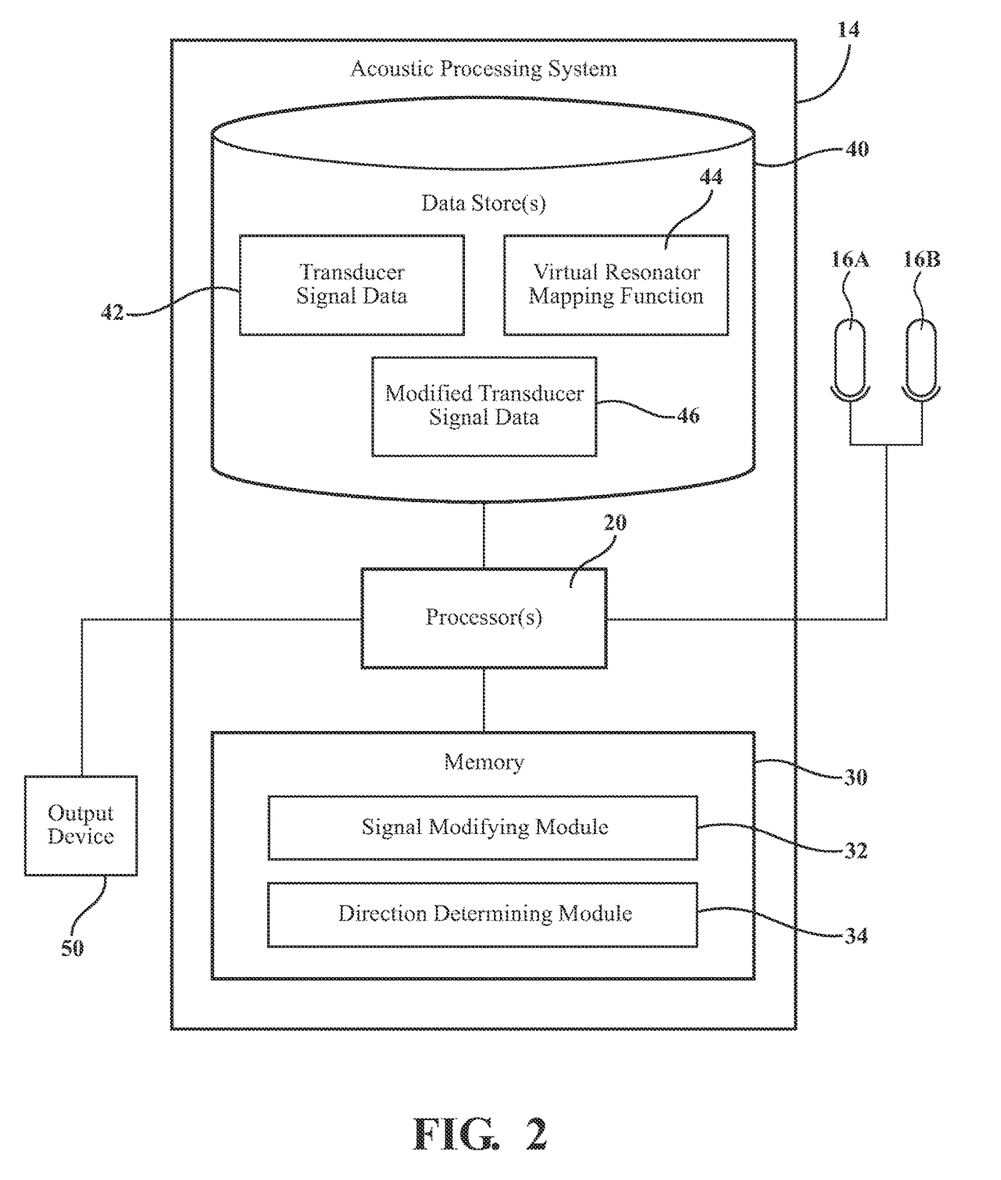
FIG. 2 illustrates a more detailed illustration of the system for modifying signals to determine an incidence angle of an incoming acoustic wave.

Referring to FIG. 2, a more detailed view of one example of the acoustic processing system 14 of FIG. 1 is shown. Like before, the acoustic processing system 14 is operably connected to the transducers 16A and 16B. As shown, the acoustic processing system 14 includes one or more processor(s) 20. Accordingly, the processor(s) 20 may be a part of the acoustic processing system 14 or the acoustic processing system 14 may access the processor(s) 20 through a data bus or another communication path. In one or more embodiments, the processor(s) 20 is an application-specific integrated circuit that is configured to implement functions associated with a signal modifying module 32 and/or a direction determining module 34. In general, the processor(s) 20 is an electronic processor such as a microprocessor that is capable of performing various functions as described herein.

In one embodiment, the acoustic processing system 14 includes a memory 30 that stores the signal modifying module 32 and/or the direction determining module 34. The memory 30 may be a random-access memory (RAM), read-only memory (ROM), a hard disk drive, a flash memory, or other suitable memory for storing the signal modifying module 32 and/or the direction determining module 34. The signal modifying module 32 and/or the direction determining module 34 are, for example, computer-readable instructions that, when executed by the processor(s) 20, cause the processor(s) 20 to perform the various functions disclosed herein.

For example, the signal modifying module 32 and/or the direction determining module 34 can be implemented as computer-readable program code. The signal modifying module 32 and/or the direction determining module 34 can be a component of the processor(s) 20, or the signal modifying module 32 and/or the direction determining module 34 can be executed on and/or distributed among other processing systems to which the processor(s) 20 is operatively connected. The modules can include instructions (e.g., program logic) executable by the processor(s) 20.

In in one or more arrangements, the signal modifying module 32 and/or the direction determining module 34 can be distributed among a plurality of the modules. Two or more of the modules described herein can be combined into a single module in one or more arrangements.

Furthermore, in one example, the acoustic processing system 14 includes one or more data store(s) 40. The data store(s) 40 is, in one embodiment, an electronic data structure such as a database that is stored in the memory 30 or another memory and that is configured with routines that can be executed by the processor(s) 20 for analyzing stored data, providing stored data, organizing stored data, generating stored data, and so on. Thus, in one embodiment, the data store(s) 40 stores data used by the signal modifying module 32 and/or the direction determining module 34 in executing various functions.

In one example, the data store(s) 40 may store the transducer signal data 42. The transducer signal data 42 includes signals generated by the transducers 16A and/or 16B in response to detecting an acoustic wave, such as the incoming acoustic wave 12 illustrated in FIG. 1. The data store(s) 40 may also store a virtual resonator mapping function 44. As will be described in greater detail later in this disclosure, the virtual mapping resonator function 44 is used by the processor(s) 20 to modify signals produced by the transducers 16A and/or 16B and possibly stored in the transducer signal data 42. These modified transducer signals may then be stored as modified transducer signal data 46 within the data store(s) 40.

The signal modifying module 32 may include instructions that, when executed by the processor(s) 20, causes the processor(s) 20 to obtain a first signal produced by the first transducers 16A generated in response to an incoming acoustic wave and a second signal produced by the second transducer 16B generated in response to the incoming acoustic wave. In one example, the signals produced by the transducers 16A and 16B may be produced in response to the same incoming acoustic wave. Generally, the incoming acoustic wave may have an incidence angle indicating the direction of the incoming acoustic wave in relation to the transducers 16A and 16B.

The signal modifying module 32 may include instructions that, when executed by the processor(s) 20, causes the processor(s) 20 to modify the first signal and the second signal using the virtual resonator mapping function 44 to generate a modified first signal and a modified second signal. The virtual resonator mapping function 44 changes the first signal and the second signal to be representative of signals produced by transducers located within a hypothetical chamber of a hypothetical resonator. As such, while this system 10 of FIG. 1 illustrates that the transducers 16A and 16B are not located within chambers of a resonator, the signals generated by transducers 16A and 16B are essentially modified so that they mimic signals that would be produced if the transducers 16A and 16B were located within chambers of a resonator. As explained previously, by using the virtual resonator mapping function 44 instead of an actual resonator, the system and method described herein can avoid situations where an actual physical resonator creates such a strong resonance that the acoustic wave to be sensed is inversely disturbed.

The virtual resonator mapping function 44 can be expressed as the following:

$$\frac{d^2}{dt^2}\begin{vmatrix} m & 0 \\ 0 & m \end{vmatrix}\begin{bmatrix} x_1 \\ x_2 \end{bmatrix} + \frac{d}{dt}\begin{vmatrix} \gamma+\delta & \gamma_c \\ \gamma_c & \gamma+\delta \end{vmatrix}\begin{bmatrix} x_1 \\ x_2 \end{bmatrix} + \begin{vmatrix} k & 0 \\ 0 & k \end{vmatrix}\begin{bmatrix} x_1 \\ x_2 \end{bmatrix} = \begin{bmatrix} f_1 \\ f_2 \end{bmatrix}, \quad (1)$$

where $f_1$ and $f_2$ are the forces exerted on two transducers 16A and 16B, respectively, by the incoming acoustic wave 12, $x_1$ and $x_2$ are the amplitudes of vibration of each hypothetical resonator cavity.

The virtual resonator mapping function 44 can essentially map the values of $f_1$ and $f_2$ to corresponding amplitudes represented by the variables $x_1$ and $x_2$. The mapping of the values may be performed by utilizing a lookup table or discrete algorithm. The response of the system 10 can be analyzed by modeling each hypothetical resonator as a harmonic oscillator, including a mass (m), damper (δ), and spring (k).

Here, the mass (m) of hypothetical resonator corresponds to a lump of air at the slit and the vicinity of the slit, which is given by $m=\rho S(l+l_c)$ with ρ being the mass density, S the cross-sectional area of the slit, l the slit length, and $l_c$ the correction length for the air mass at the vicinity of the slit. In addition, the spring (k) corresponding to the springiness of air inside the cavity is expressed by $k=\rho c S^2/V$ with c the speed of sound and V the cavity volume. The diagonal elements of the damping matrix (i.e., δ and γ) indicate damping responsible for the decay of the vibrations in the hypothetical resonators, γ is the radiation leakage describing coupling between a hypothetical resonator and environment, while δ is the nonradiative loss occurring around the slits of the hypothetical resonator. The off-diagonal elements of the damping matrix ($\gamma_c$) represent the radiative coupling between oscillators 1 and 2.

By solving Equation 1, with the definition of $x_{ij}=x_i/x_j$, the vibration amplitude of oscillator 1 is represented by $$x_{1(2)}(\omega) = \frac{f_{1(2)}(\omega)/m}{\left[\omega_0^2 - \omega^2 + \frac{1}{m}\text{Im}(\gamma + \gamma_c X_{21(12)})\omega\right] - i\frac{1}{m}[\delta + \text{Re}(\gamma + \gamma_c X_{21(12)})]\omega}, \quad (2)$$

where ω is the radian frequency, and $\omega_0$ is the natural frequency ($=\sqrt{k/m}$).

From Equation (2), both γ and $\gamma_c$ may play a role in determining the response of the hypothetical resonator, constituting effective damping (i.e., $\gamma_{\text{eff},1(2)}=\gamma+\gamma_c X_{21(12)}$). Note that the coupling effect may be characterized by a combination of $\gamma_c$ and $X_{21(12)}$, and the magnitude of $X_{21(12)}$ determines the strength of the coupling. The imaginary part of $\gamma_{\text{eff}}$ may be responsible for resonance shift, while the real part determines the vibration amplitude.

Under assumptions of adiabatic volume changes and negligible pressure variations inside the cavity, the pressure inside a first cavity of the hypothetical resonator where the first transducer 16A would be placed is expressed with $x_1$ in Equation (2) by $$p_1 = -\gamma_s \frac{S_1}{V_1} x_1, \quad (3)$$

where $\gamma_s$ is the ratio of specific heats (1.4 for air).

Using the acoustic power inside the cavity $$\left(P_1 = \frac{|p_1|^2}{2\rho c}\right),$$

the power ratio of the signals is represented by $P_1/P_2=|x_1|^2/|x_2|^2$.

Figure 3A:
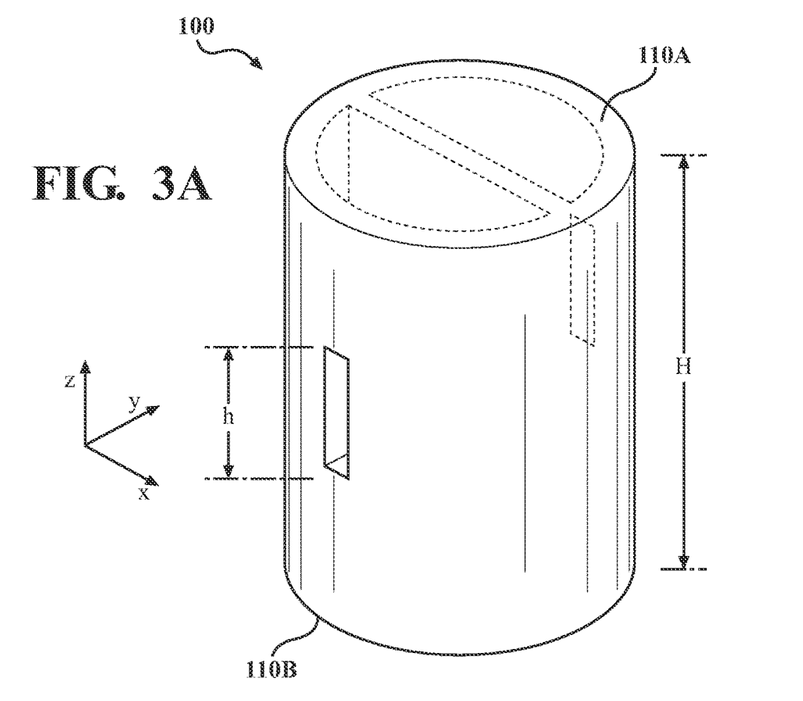
FIGS. 3A-3D illustrate different views of a hypothetical resonator used with a virtual mapping function to modify signals obtained from transducers.
Figure 3B:
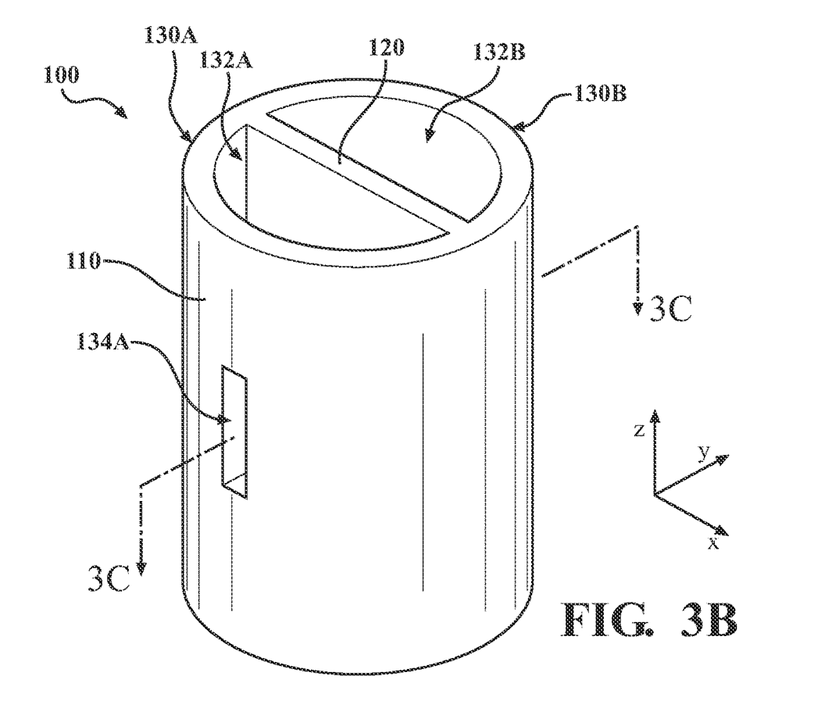
Figure 3C:
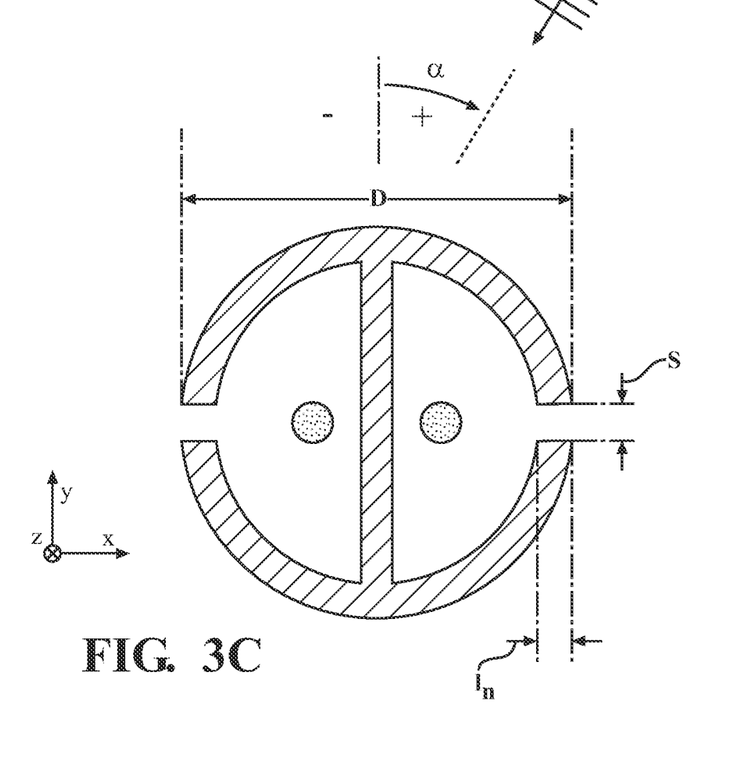
Figure 3D:
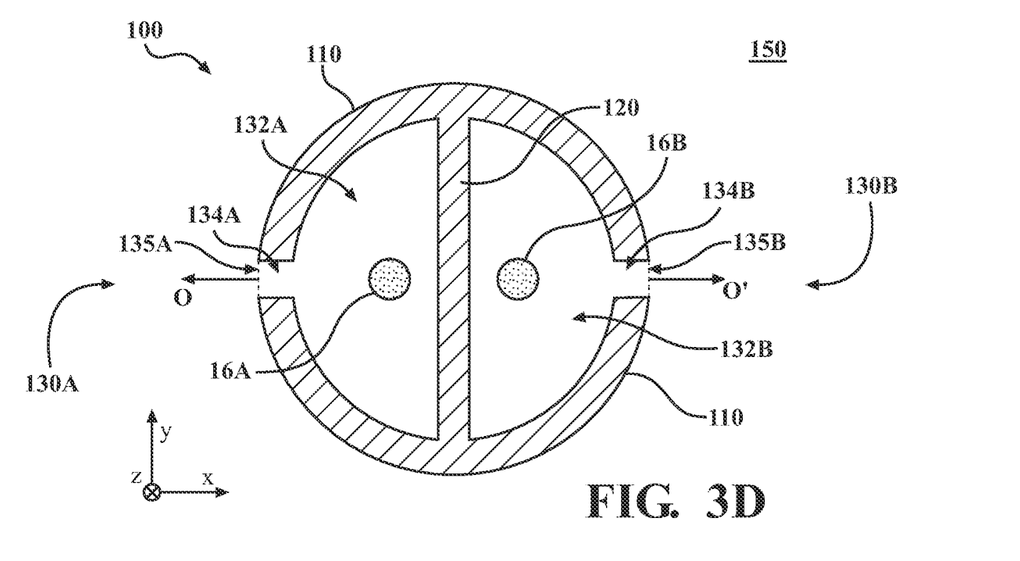

One example of a hypothetical resonator is illustrated in FIG. 3A-3D. It should also be noted that the hypothetical resonator can take any number of different forms, such as the resonators described in U.S. Pat. App. Pub. No. 2021/0127201A1, which, as previously noted, is hereby incorporated by reference in its entirety. FIGS. 3A and 3B are perspective views of a hypothetical resonator 100. FIGS. 3C and 3D are top plan views of the hypothetical resonator 100 of FIGS. 3A and 3B, viewed along the line 3C-3C of FIG. 3B. FIGS. 3A and 3C illustrate dimensions of the hypothetical resonator 100 and FIGS. 3B and 3D illustrate various structural components of the hypothetical resonator 100.

Focusing momentarily on FIG. 3D, the hypothetical resonator 100 includes at least two hypothetical Helmholtz resonators 130A, 130B. Each hypothetical Helmholtz resonator includes a hypothetical chamber 132A, 132B, and a hypothetical neck 134A, 134B. Each hypothetical neck 134A, 134B places its respective hypothetical chamber 132A, 132B in fluid communication with the ambient environment 150. Each hypothetical neck 134A, 134B further defines a hypothetical entrance plane 135A, 135B (sometimes referred to as a slit), and a resonator orientation O, O' orthogonal to the hypothetical entrance plane 135A, 135B of the hypothetical resonator's neck 134A, 134B.

Focusing particularly on FIGS. 3B and 3D, each hypothetical acoustic chamber 132A, 132B is defined by at least one hypothetical exterior wall 110. Because in the example of FIGS. 3A-3D, the at least two hypothetical Helmholtz resonators 130A, 130B are connected, and indeed constitute longitudinal halves of a shared cylinder, the hypothetical acoustic chambers 132A, 132B of this example are further defined by a hypothetical interior wall 120 separating the two hypothetical chambers 132A, 132B from one another and the at least one exterior wall 110 is a single, continuous wall surrounding both hypothetical acoustic chambers 132A, 132B. In some variations, the at least two hypothetical Helmholtz resonators may be physically separate (i.e., non-contacting relative to one another). Thus the at least one exterior wall will, in such variations, constitute more than one hypothetical exterior wall 110.

Each of the hypothetical acoustic chambers 132A, 132B may be enclosed, aside from the hypothetical neck 134A, 134B. Thus, in the example of FIGS. 3A-3D, each hypothetical acoustic chamber 132A, 132B is further defined by end walls (top and bottom), but the top end wall is omitted from the view of FIGS. 3A and 3B to enable viewing of the hypothetical resonator 100 interior. Each hypothetical acoustic chamber 132A, 132B thus defines a contained volume defined by the product of the height, H, and the lateral area. In the case of the example of FIGS. 3A-3D, the lateral area of each hypothetical acoustic chamber 132A, 132B is defined by:

$$A = \pi\left(\frac{D}{2}\right)^2 \quad (4)$$

and the contained volume of each hypothetical acoustic chamber 132A, 132B is defined by:

$$V = H\pi\left(\frac{D}{2}\right)^2 \quad (5)$$

where H is the hypothetical resonator 100 height and D is the hypothetical resonator 100 diameter. It will be understood that the contained volume of each hypothetical acoustic chamber 132A, 132B can be similarly calculated regardless of the different shapes.

In the example of FIGS. 3A-3D, each hypothetical neck 134A, 134B is formed of a hypothetical aperture in the at least one hypothetical exterior wall 110. While the shape of said aperture is generally not prescribed, each hypothetical neck 134A, 134B generally has a neck length, $l_n$, and a surface area, S, defined by:

$$S = wh \quad (6)$$

where w and h are the hypothetical neck (aperture) width and height, respectively.

It will thus be understood that each hypothetical Helmholtz resonator 130A, 130B has a resonance frequency, $f_{res}$, defined by:

$$f_{res} = \frac{c}{2\pi}\sqrt{\frac{S}{Vl_n}} \quad (7)$$

where c is the speed of sound in the ambient atmosphere.

Thus, when an incident wave at or near the resonance frequency, $f_{res}$, is incident on one of the at least one hypothetical Helmholtz resonators 130A, 130B, that resonator will resonate. As stated before, the hypothetical resonator 100 is merely hypothetical and is virtual. As such, signals produced by the transducers 16A and 16B are essentially modified by the virtual resonator mapping function 44 to be signals that would be simply produced as if the transducers 16A and 16B were located within the hypothetical Helmholtz resonators 130A, 130B, as shown in FIG. 3D.

It will be understood, and with reference to Equation 7, that dimensions of the hypothetical resonator 100 can be altered for differing applications and different desired resonance frequencies. In the case of the exemplary 1890 Hz resonance frequency, H=25 mm, h=10 mm, D=20 mm, and w=1 mm. For 20 kHz resonance frequency, all dimensions can be one-tenth of those listed above.

Once the first signal from the first transducer 16A and the second signal from the second transducer 16B have been modified to be representative of signals produced by transducers 16A and 16B located within a hypothetical chambers 130A, 130B, of a hypothetical resonator 100, the direction determining module 34 may cause the processor(s) 20 to determine the incidence angle of the incoming acoustic wave. The determination of the incidence angle of the incoming acoustic wave and/or the first and second modified signals may be output to an output device, such as output device 50 of FIG. 2. The output device 50 includes a device, or component, that enables information/data to be presented to a person or another electronic device.

For example, referring back to FIG. 1, using the modified signals, the processor(s) 20 can determine the incidence angle α of the incoming acoustic wave 12. The incidence angle α may be the angle with respect to a baseline 17 that extends from a point 19 located between the first transducer 16A and the second transducer 16B. The point 19 may be a midpoint between the first transducer 16A and the second transducer 16B. The baseline 17 may be substantially perpendicular to a direction 21 defined between the first transducer 16A and the second transducer 16B. Moreover, the direction 21 is the direction of the arrangement of the first transducer 16A and the second transducer 16B.

Figure 4:
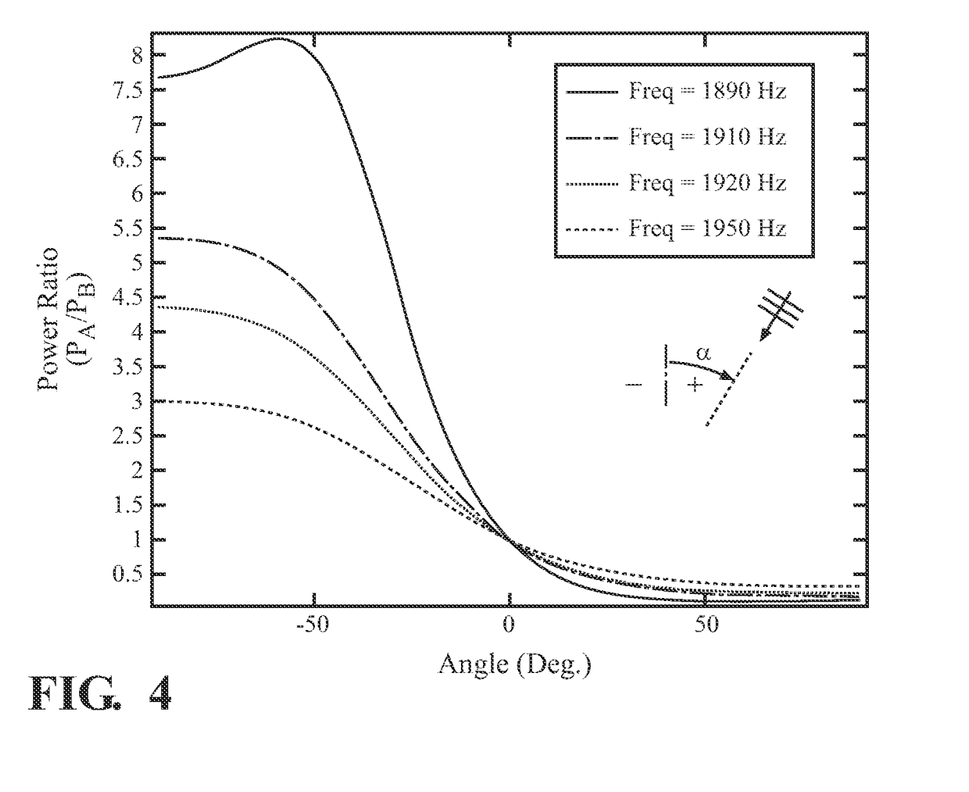
FIG. 4 is a graph of an acoustic power ratio as a function of incidence angle for determining the incidence angle of an incoming acoustic wave.

As shown in FIG. 4, as incidence angle α changes, the power ratio, $P_A/P_B$ changes as well, reaching a maximum at an incident angle of −90° at most frequencies. At 1890 Hz, the power ratio reaches a maximum at about −60° and then exhibits a modest dip and plateau to −90°. It will be understood that, in many implementations, it may be simpler to determine acoustic incidence angle when there is a continuous increase in power ratio with increasing angle up to −90° so that there are no instances of different angles with the same power ratio. For this reason, it may be preferable to monitor incidence angle for frequencies that fit this profile, such as frequencies greater than 1910 Hz in the example of FIG. 4. At the same time, it will be understood that detection sensitivity is greatest when the frequency of the detected wave closely matches $f_{res}$ of the hypothetical resonator 100, i.e., 1890 Hz in the example of FIG. 4. In such a case, and where high sensitivity is required, it may be suitable to monitor acoustic incidence angle across a narrower window, such as ±50°.

Because the power ratio shown is $P_A/P_B$, and not $P_B/P_A$, only a fractional response ($P_A/P_B<1$) is shown at positive angles. It will be understood that a curve of $P_B/P_A$ would be a mirror image of the curve of $P_A/P_B$, with a maximum at +50°. As shown in FIG. 4, the response is strongest at the resonance frequency, $f_{res}$, but is still substantial at frequencies 60 or more Hz distal from the resonance frequency. It will be understood that the signals obtained by the two microphones inside the chambers can be Fourier transformed to check incident pitch.

The direction determining module 34 may cause the processor(s) 20 to determine the incidence angle α of the incoming acoustic wave 12 based on the ratio of $P_A$ and $P_B$, which may be the modified first signal and the modified second signal, respectively. Once the ratio is determined, a data structure, which may be similar to the chart shown in FIG. 4, may be referred to using the ratio to determine the angle of incidence. In one example, the data structure may be a lookup table that contains a cross-reference between the ratio and a particular incidence angle of an incoming acoustic wave at a particular frequency.

Therefore, because the system 10 does not require an actual resonator but utilizes a virtual resonator by way of the virtual resonator mapping function 44, the system 10 can produce signals that would be produced if the transducers were located in chambers of a resonator, such as shown and described in U.S. Pat. App. Pub. No. 2021/0127201A1, but without actually requiring that the transducers be located within a resonator. As explained previously, this is advantageous because an actual physical resonator may cause the generation of a strong resonance that may inversely disturb the sound to be sensed. Here, because no actual physical resonator is utilized, this drawback is mitigated.

Figure 5:
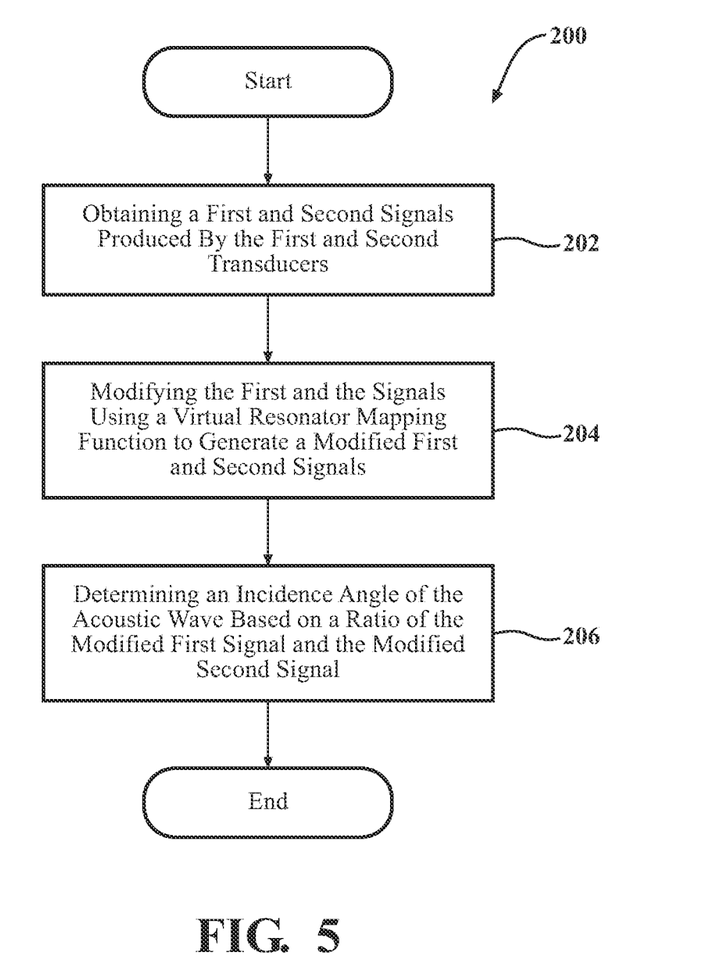
FIG. 5 illustrates a method for modifying signals to determine an incidence angle of an incoming acoustic wave.

Referring to FIG. 5, a method 200 for modifying signals to determine an incidence angle of an acoustic wave is illustrated. The method 200 will be described from the viewpoint of the system 10 of FIG. 1 and the acoustic processing system 14 of FIG. 2. However, it should be understood that this is just one example of implementing the method 200. While method 200 is discussed in combination with the system 10 and the acoustic processing system 14, it should be appreciated that the method 200 is not limited to being implemented within the system 10 and the acoustic processing system 14, but is instead one example of a system that may implement the method 200.

The method 200 may begin at step 202, where the signal modifying module 32 causes the processor(s) 20 to obtain a first signal produced by the first transducers 16A generated in response to an incoming acoustic wave 12 and a second signal produced by the second transducer 16B generated in response to the incoming acoustic wave 12. In one example, the obtaining of the first and second signals may occur at roughly the same time. However, the obtaining of the first and second signals may occur sequentially.

In step 204, the signal modifying module 32 causes the processor(s) 20 to modify the first and second signals using the virtual resonator mapping function 44 to generate a modified first signal and a modified second signal. As explained previously, the virtual resonator mapping function 44 changes the first signal and the second signal to be representative of signals produced by transducers located within a hypothetical chamber of a hypothetical resonator. With reference to Equation 1, the virtual resonator mapping function 44 can essentially map the values of $f_1$ and $f_2$ to corresponding amplitudes represented by the variables $x_i$ and $x_2$.

In step 206, which may be optional, the direction determining module 34 causes the processor(s) 20 to determine the incidence angle of the incoming acoustic wave 12. As explained previously, the modified first signal and the modified second signal represent an acoustical power within hypothetical chambers of a resonator. As such, the first modified signal may be $P_A$, and the second modified signal may be $P_B$. The direction determining module 34 causes the processor(s) 20 to determine the incidence angle of the acoustic wave based on a ratio of the modified first signal ($P_A$) and the modified second signal ($P_B$). Once the ratio is determined, the direction determining module 34 causes the processor(s) 20 to refer to a data structure, which may be similar to the chart shown in FIG. 4, to determine the angle of incidence. As explained before, in one example, the data structure may be a lookup table that contains a cross-reference between the ratio and a particular incidence angle of an incoming acoustic wave at a particular frequency.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. As used herein, the term "another" is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor;
   a first transducer in communication with the processor, the first transducer configured to produce a first signal in response to detecting an acoustic wave;
   a second transducer in communication with the processor, the second transducer configured to produce a second signal in response to detecting the acoustic wave; and
   a memory in communication with the processor and having machine-readable instructions that, when executed by the processor, cause the processor to modify the first signal and the second signal using a virtual resonator mapping function to generate a modified first signal and a modified second signal, the virtual resonator mapping function changes the first signal and the second signal to be representative of signals produced by transducers located within a hypothetical chamber of a hypothetical resonator.

2. The system of claim 1, wherein the machine-readable instructions further include instructions that, when executed by the processor, cause the processor to determine an incidence angle of the acoustic wave based on a ratio of the modified first signal and the modified second signal.

3. The system of claim 1, wherein at least one of the first transducer and the second transducer is a microphone.

4. The system of claim 3, wherein the microphone is a condenser microphone.

5. The system of claim 1, wherein the hypothetical resonator comprises:
   a first hypothetical chamber having a first hypothetical neck pointing in a first direction, placing the first hypothetical chamber in fluid communication with an ambient environment; and
   a second hypothetical chamber having a second hypothetical neck pointing in a second direction, placing the second hypothetical chamber in fluid communication with the ambient environment.

6. The system of claim 5, wherein the machine-readable instructions further include instructions that, when executed by the processor, cause the processor to:
   using the virtual resonator mapping function, generate the modified first signal by changing the first signal to be representative of a signal produced by the first transducer located within the first hypothetical chamber of the hypothetical resonator; and
   using the virtual resonator mapping function, generate the modified second signal by changing the second signal to be representative of a signal produced by the second transducer located within the second hypothetical chamber of the hypothetical resonator.

7. The system of claim 6, wherein the modified first signal represents an acoustical power within the first hypothetical chamber and the modified second signal represents an acoustical power within the second hypothetical chamber.

8. A method comprising steps of:
   obtaining a first signal produced by a first transducer in response to detecting an acoustic wave;
   obtaining a second signal produced by a second transducer in response to detecting the acoustic wave; and
   modifying, by a processor, the first signal and the second signal using a virtual resonator mapping function to generate a modified first signal and a modified second signal, the virtual resonator mapping function changes the first signal and the second signal to be representative of signals produced by transducers located within a hypothetical chamber of a hypothetical resonator.

9. The method of claim 8, further comprising the step of determining, by the processor, an incidence angle of the acoustic wave based on a ratio of the modified first signal and the modified second signal.

10. The method of claim 8, wherein at least one of the first transducer and the second transducer is a microphone.

11. The method of claim 10, wherein the microphone is a condenser microphone.

12. The method of claim 8, wherein the hypothetical resonator comprises:
   a first hypothetical chamber having a first hypothetical neck pointing in a first direction, placing the first hypothetical chamber in fluid communication with an ambient environment; and
   a second hypothetical chamber having a second hypothetical neck pointing in a second direction, placing the second hypothetical chamber in fluid communication with an ambient environment.

13. The method of claim 12, further including the steps of:
   using the virtual resonator mapping function, generating, by the processor, the modified first signal by changing the first signal to be representative of a signal produced by the first transducer located within the first hypothetical chamber of the hypothetical resonator; and
   using the virtual resonator mapping function, generating, by the processor, the modified second signal by changing the second signal to be representative of a signal produced by the second transducer located within the second hypothetical chamber of the hypothetical resonator.

14. The method of claim 13, wherein the modified first signal represents an acoustical power within the first hypothetical chamber and the modified second signal represents an acoustical power within the second hypothetical chamber.

15. A non-transitory computer-readable medium having instructions that, when executed by a processor, cause the processor to:
    obtain a first signal produced by a first transducer in response to detecting an acoustic wave;
    obtain a second signal produced by a second transducer in response to detecting the acoustic wave; and
    modify the first signal and the second signal using a virtual resonator mapping function to generate a modified first signal and a modified second signal, the virtual resonator mapping function changes the first signal and the second signal to be representative of signals produced by transducers located within a hypothetical chamber of a hypothetical resonator.

16. The non-transitory computer-readable medium of claim 15, further including instructions that, when executed by the processor, cause the processor to determine an incidence angle of the acoustic wave based on a ratio of the modified first signal and the modified second signal.

17. The non-transitory computer-readable medium of claim 15, wherein at least one of the first transducer and the second transducer is a microphone.

18. The non-transitory computer-readable medium of claim 15, wherein the hypothetical resonator comprises:
    a first hypothetical chamber having a first hypothetical neck pointing in a first direction, placing the first hypothetical chamber in fluid communication with an ambient environment; and
    a second hypothetical chamber having a second hypothetical neck pointing in a second direction, placing the second hypothetical chamber in fluid communication with an ambient environment.

19. The non-transitory computer-readable medium of claim 18, further including instructions that, when executed by the processor, cause the processor to:
    using the virtual resonator mapping function, generate the modified first signal by changing the first signal to be representative of a signal produced by the first transducer located within the first hypothetical chamber of the hypothetical resonator; and
    using the virtual resonator mapping function, generate the modified second signal by changing the second signal to be representative of a signal produced by the second transducer located within the second hypothetical chamber of the hypothetical resonator.

20. The non-transitory computer-readable medium of claim 19, wherein the modified first signal represents an acoustical power within the first hypothetical chamber and the modified second signal represents an acoustical power within the second hypothetical chamber.

* * * * *